(12) United States Patent
Heyder et al.

(10) Patent No.: US 7,644,514 B2
(45) Date of Patent: Jan. 12, 2010

(54) CLOTHES DRYER

(75) Inventors: Reinhard Heyder, Berlin (DE);
Thomas Nawrot, Berlin (DE); Andreas Ziemann, Potsdam (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 145 days.

(21) Appl. No.: 10/584,162

(22) PCT Filed: Dec. 23, 2004

(86) PCT No.: PCT/EP2004/053689

§ 371 (c)(1),
(2), (4) Date: Feb. 21, 2007

(87) PCT Pub. No.: WO2005/064069

PCT Pub. Date: Jul. 14, 2005

(65) Prior Publication Data

US 2007/0151119 A1    Jul. 5, 2007

(30) Foreign Application Priority Data

Dec. 23, 2003  (DE) ................................ 103 60 898

(51) Int. Cl.
*D06F 58/06* (2006.01)
(52) U.S. Cl. .............................. 34/595; 34/609; 34/218
(58) Field of Classification Search .................. 34/595, 34/609, 218
See application file for complete search history.

(56) References Cited

U.S. PATENT DOCUMENTS

| | | | | |
|---|---|---|---|---|
| 1,636,384 A | * | 7/1927 | Nicholls | 241/60 |
| 1,661,721 A | * | 3/1928 | Gardner | 241/281 |
| 1,867,739 A | * | 7/1932 | Frazee | 366/18 |
| 2,046,525 A | * | 7/1936 | Miller | 264/234 |
| 2,084,713 A | * | 6/1937 | Thayer | 432/107 |
| 2,098,066 A | * | 11/1937 | Sibson, Jr. | 68/20 |
| 2,134,331 A | * | 10/1938 | Gee | 208/38 |
| 2,141,119 A | * | 12/1938 | Wheeler, Jr. et al. | 101/91 |
| 2,236,691 A | * | 4/1941 | Meinzer | 65/20 |
| 2,237,690 A | * | 4/1941 | Robic | 261/30 |
| 2,271,757 A | * | 2/1942 | Boltz | 34/82 |
| 2,300,690 A | * | 11/1942 | Neuman | 68/24 |
| 2,437,216 A | * | 3/1948 | Wilson et al. | 141/34 |
| 2,452,858 A | * | 11/1948 | Miller | 264/605 |
| 2,460,422 A | * | 2/1949 | Koppel | 34/606 |
| 2,486,058 A | | 10/1949 | Patterson et al. | |

(Continued)

FOREIGN PATENT DOCUMENTS

DE        30 12 933        10/1980

(Continued)

OTHER PUBLICATIONS

International Search Report PCT/EP2004/053689, Oct. 27, 2007.

*Primary Examiner*—Stephen M. Gravini
(74) *Attorney, Agent, or Firm*—James E. Howard; Andre Pallapies

(57) ABSTRACT

A clothes dryer which comprises a housing, a rotatable drum for receiving the clothes and a bearing for rotatably receiving the drum in the housing. In order to protect the bearing from overheating, a cooling air device for cooling the bearing is provided.

20 Claims, 5 Drawing Sheets

U.S. PATENT DOCUMENTS

| | | | | |
|---|---|---|---|---|
| 2,523,305 A * | 9/1950 | Johnson | | 68/53 |
| 2,585,020 A * | 2/1952 | Lessard et al. | | 62/346 |
| 2,617,203 A * | 11/1952 | Murray | | 34/82 |
| 2,619,737 A * | 12/1952 | Geldhof et al. | | 34/604 |
| 2,651,269 A * | 9/1953 | French | | 425/72.1 |
| 2,657,475 A * | 11/1953 | Erickson | | 34/139 |
| 2,664,646 A * | 1/1954 | Bourner | | 34/82 |
| 2,686,372 A * | 8/1954 | Graham | | 34/75 |
| 2,688,806 A * | 9/1954 | Long | | 34/75 |
| 2,701,421 A * | 2/1955 | Erickson et al. | | 34/530 |
| 2,718,711 A * | 9/1955 | Clark | | 34/75 |
| 2,724,906 A * | 11/1955 | Pfleider | | 34/75 |
| 2,742,708 A * | 4/1956 | McCormick | | 34/76 |
| 2,750,782 A * | 6/1956 | Du Hamell, Jr. | | 68/140 |
| 2,751,688 A * | 6/1956 | Douglas | | 34/82 |
| 2,752,694 A * | 7/1956 | McCormick | | 34/60 |
| 2,776,826 A * | 1/1957 | Bennett et al. | | 432/46 |
| 2,792,640 A * | 5/1957 | Patterson | | 34/75 |
| 2,798,304 A * | 7/1957 | Reiter | | 34/91 |
| 2,813,414 A * | 11/1957 | Johnston | | 68/20 |
| 2,814,130 A * | 11/1957 | Cayot | | 34/82 |
| 2,814,886 A * | 12/1957 | Fowler | | 34/605 |
| 2,824,385 A * | 2/1958 | Toma | | 34/75 |
| 2,824,386 A * | 2/1958 | Stone | | 34/75 |
| 2,830,384 A * | 4/1958 | Zehrbach | | 34/604 |
| 2,834,121 A * | 5/1958 | Geldhof | | 34/75 |
| 2,843,943 A * | 7/1958 | Geldhof et al. | | 34/75 |
| 2,843,944 A * | 7/1958 | Toma et al. | | 34/75 |
| 2,856,699 A * | 10/1958 | Frey | | 34/75 |
| 2,864,175 A * | 12/1958 | Stone | | 34/75 |
| 2,866,273 A * | 12/1958 | Geldhof | | 34/75 |
| 2,873,537 A * | 2/1959 | Gray, Jr. et al. | | 34/75 |
| 2,880,521 A * | 4/1959 | Gray, Jr. | | 34/75 |
| 2,892,335 A * | 6/1959 | Gray, Jr. | | 68/16 |
| 2,893,135 A * | 7/1959 | Smith | | 34/610 |
| 2,896,381 A * | 7/1959 | Lange | | 53/426 |
| 2,899,816 A * | 8/1959 | Jacobsen, Jr. | | 68/20 |
| 2,911,731 A * | 11/1959 | Bochan | | 34/75 |
| 2,921,384 A * | 1/1960 | Smith | | 34/75 |
| 2,934,809 A * | 5/1960 | Schaab et al. | | 26/2 E |
| 2,958,138 A * | 11/1960 | Ashby | | 34/601 |
| 2,985,966 A * | 5/1961 | Martin | | 34/75 |
| 2,993,687 A * | 7/1961 | Gieskieng | | 106/754 |
| 2,996,809 A * | 8/1961 | Shapter | | 34/75 |
| 3,018,562 A * | 1/1962 | Orr | | 34/75 |
| 3,019,835 A * | 2/1962 | Maurand | | 159/9.2 |
| 3,027,653 A * | 4/1962 | Long et al. | | 34/86 |
| 3,030,712 A * | 4/1962 | Chandley | | 34/92 |
| 3,040,440 A * | 6/1962 | Mellinger et al. | | 34/75 |
| 3,060,593 A * | 10/1962 | Flora et al. | | 34/601 |
| 3,066,422 A * | 12/1962 | Douglas | | 34/82 |
| 3,066,423 A * | 12/1962 | Solem | | 34/86 |
| 3,098,726 A * | 7/1963 | Stone | | 34/596 |
| 3,121,000 A * | 2/1964 | Hubbard | | 34/75 |
| 3,147,107 A * | 9/1964 | Brooke | | 75/436 |
| 3,237,314 A * | 3/1966 | Smith, Jr. | | 34/266 |
| 3,252,607 A * | 5/1966 | Boyd et al. | | 414/416.02 |
| 3,267,701 A * | 8/1966 | Mandarino | | 68/12.15 |
| 3,280,716 A * | 10/1966 | Gall | | 396/603 |
| 3,309,440 A * | 3/1967 | Kracht | | 264/53 |
| 3,333,346 A * | 8/1967 | Brucken | | 34/131 |
| 3,350,068 A * | 10/1967 | Vincendon | | 366/149 |
| 3,358,623 A * | 12/1967 | Lenz et al. | | 110/226 |
| 3,371,000 A * | 2/1968 | Davenport et al. | | 156/180 |
| 3,387,385 A * | 6/1968 | Mandarino, Jr. et al. | | 34/596 |
| 3,389,707 A * | 6/1968 | Wochnowski | | 131/303 |
| 3,399,464 A * | 9/1968 | Erickson et al. | | 34/605 |
| 3,406,505 A * | 10/1968 | Hanson | | 56/12.8 |
| 3,419,969 A | 1/1969 | Freze | | |
| 3,432,936 A * | 3/1969 | Greenhalgh et al. | | 34/306 |
| 3,460,818 A * | 8/1969 | Tage et al. | | 266/179 |
| 3,469,272 A * | 9/1969 | Gaudry et al. | | 15/50.1 |
| 3,477,873 A * | 11/1969 | Koelsch | | 127/43 |
| 3,541,603 A * | 11/1970 | Sawada et al. | | 266/137 |
| 3,589,691 A * | 6/1971 | Greaves | | 432/7 |
| 3,659,441 A * | 5/1972 | Schuierer | | 68/4 |
| 3,859,004 A * | 1/1975 | Condit | | 34/75 |
| 3,890,179 A * | 6/1975 | Deardurff | | 156/53 |
| RE28,459 E * | 7/1975 | Cole et al. | | 34/306 |
| 3,901,016 A * | 8/1975 | Hurley | | 57/7 |
| 3,969,070 A * | 7/1976 | Thompson | | 432/105 |
| 3,978,592 A * | 9/1976 | Schuurink | | 34/82 |
| 4,014,722 A * | 3/1977 | Deardurff | | 156/52 |
| 4,015,102 A * | 3/1977 | Zadorozny | | 219/155 |
| 4,033,047 A * | 7/1977 | Kawai | | 34/82 |
| 4,070,215 A * | 1/1978 | Gelin | | 156/51 |
| 4,106,114 A * | 8/1978 | Moore | | 366/131 |
| 4,180,455 A * | 12/1979 | Taciuk | | 208/126 |
| 4,243,183 A * | 1/1981 | Eirich et al. | | 241/186.2 |
| 4,255,101 A * | 3/1981 | Paoletti et al. | | 425/68 |
| 4,259,764 A * | 4/1981 | Downing | | 19/41 |
| 4,285,773 A * | 8/1981 | Taciuk | | 202/100 |
| 4,380,844 A * | 4/1983 | Waldhauser et al. | | 15/320 |
| 4,492,002 A * | 1/1985 | Waldhauser et al. | | 15/320 |
| 4,510,361 A * | 4/1985 | Mahan | | 219/697 |
| 4,597,352 A * | 7/1986 | Norminton | | 114/254 |
| 4,621,438 A * | 11/1986 | Lanciaux | | 34/77 |
| 4,669,199 A * | 6/1987 | Clawson et al. | | 34/82 |
| 4,689,896 A * | 9/1987 | Narang | | 34/82 |
| 4,698,507 A * | 10/1987 | Tator et al. | | 250/429 |
| 4,702,018 A * | 10/1987 | Hastings | | 34/130 |
| 4,765,066 A * | 8/1988 | Yoon | | 34/261 |
| 4,891,892 A * | 1/1990 | Narang | | 34/86 |
| 4,974,339 A * | 12/1990 | Kawamura et al. | | 34/73 |
| 5,042,171 A * | 8/1991 | Obata et al. | | 34/604 |
| 5,074,131 A * | 12/1991 | Hirose et al. | | 68/19.2 |
| 5,092,960 A * | 3/1992 | Brown | | 159/48.1 |
| 5,207,764 A * | 5/1993 | Akabane et al. | | 68/20 |
| 5,327,034 A * | 7/1994 | Couture et al. | | 310/67 R |
| 5,355,039 A * | 10/1994 | Couture | | 310/67 R |
| 5,437,418 A * | 8/1995 | Graef et al. | | 241/65 |
| 5,438,228 A * | 8/1995 | Couture et al. | | 310/67 R |
| 5,459,945 A * | 10/1995 | Shulenberger | | 34/605 |
| 5,507,565 A * | 4/1996 | LeBegue et al. | | 299/12 |
| 5,887,456 A * | 3/1999 | Tanigawa et al. | | 68/20 |
| 5,887,498 A * | 3/1999 | Miyamoto et al. | | 82/1.11 |
| 5,908,165 A * | 6/1999 | Guschall et al. | | 241/23 |
| 5,940,988 A * | 8/1999 | Eisen | | 34/596 |
| 5,976,220 A * | 11/1999 | Braun et al. | | 95/45 |
| 6,105,273 A * | 8/2000 | Johanson et al. | | 34/267 |
| 6,248,153 B1 * | 6/2001 | Braun et al. | | 95/45 |
| 6,293,121 B1 * | 9/2001 | Labrador | | 62/304 |
| 6,327,994 B1 * | 12/2001 | Labrador | | 114/382 |
| 6,436,231 B1 * | 8/2002 | Graef et al. | | 162/9 |
| 6,510,716 B1 * | 1/2003 | Kim et al. | | 68/24 |
| 6,626,984 B1 * | 9/2003 | Taylor | | 96/380 |
| 6,692,544 B1 * | 2/2004 | Grillenzoni | | 44/589 |
| 6,954,995 B2 * | 10/2005 | Kitamura et al. | | 34/597 |
| 6,968,632 B2 * | 11/2005 | Guinibert et al. | | 34/602 |
| 6,993,930 B2 * | 2/2006 | Blackstone | | 62/421 |
| 7,055,262 B2 * | 6/2006 | Goldberg et al. | | 34/86 |
| 7,065,905 B2 * | 6/2006 | Guinibert et al. | | 34/603 |
| 7,117,827 B1 * | 10/2006 | Hinderks | | 123/43 R |
| 7,166,570 B2 * | 1/2007 | Hunter et al. | | 514/2 |
| 7,225,562 B2 * | 6/2007 | Guinibert et al. | | 34/601 |
| 7,257,905 B2 * | 8/2007 | Guinibert et al. | | 34/82 |
| 7,266,965 B2 * | 9/2007 | Blackstone | | 62/259.3 |
| 7,266,966 B2 * | 9/2007 | Blackstone | | 62/259.3 |
| 7,438,027 B1 * | 10/2008 | Hinderks | | 123/43 R |
| 7,467,483 B2 * | 12/2008 | Guinibert et al. | | 34/601 |
| 2003/0119400 A1 * | 6/2003 | Beitz et al. | | 442/327 |
| 2003/0119401 A1 * | 6/2003 | Chakravarty et al. | | 442/327 |
| 2003/0119405 A1 * | 6/2003 | Abuto et al. | | 442/361 |
| 2003/0119413 A1 * | 6/2003 | Chakravarty et al. | | 442/414 |

| | | | | | | |
|---|---|---|---|---|---|---|
| 2004/0168459 A1* | 9/2004 | Blackstone ................ 62/259.2 | 2007/0006477 A1* | 1/2007 | Guinibert et al. ............... 34/85 |
| 2004/0204698 A1* | 10/2004 | Zenker et al. ............... 604/367 | 2007/0113421 A1* | 5/2007 | Uhara et al. .................. 34/275 |
| 2004/0216326 A1* | 11/2004 | Kitamura et al. .............. 34/597 | 2007/0151119 A1* | 7/2007 | Heyder et al. ................. 34/601 |
| 2005/0016199 A1* | 1/2005 | Blackstone .................. 62/420 | 2007/0186440 A1* | 8/2007 | Guinibert et al. ............. 34/603 |
| 2005/0076535 A1* | 4/2005 | Guinibert et al. .............. 34/601 | 2007/0208134 A1* | 9/2007 | Hunter et al. .............. 525/54.1 |
| 2005/0115104 A1* | 6/2005 | Guinibert et al. .............. 34/601 | 2007/0220776 A1* | 9/2007 | Guinibert et al. ............. 34/603 |
| 2005/0147562 A1* | 7/2005 | Hunter et al. ................. 424/9.5 | 2007/0299043 A1* | 12/2007 | Hunter et al. ............... 514/171 |
| 2005/0147599 A1* | 7/2005 | Hunter et al. ........... 424/94.63 | 2008/0066484 A1* | 3/2008 | Blackstone .................. 62/421 |
| 2005/0147643 A1* | 7/2005 | Hunter et al. ............... 424/423 | 2008/0268395 A1* | 10/2008 | Lahmostov et al. ........... 432/31 |
| 2005/0148512 A1* | 7/2005 | Hunter et al. ................. 514/12 | 2009/0044932 A1* | 2/2009 | Blackstone ................. 165/158 |
| 2005/0158274 A1* | 7/2005 | Hunter et al. ........... 424/78.38 | | | |
| 2005/0169958 A1* | 8/2005 | Hunter et al. ............... 424/423 | | | |
| 2005/0175657 A1* | 8/2005 | Hunter et al. ............... 424/422 | | | |
| 2005/0178138 A1* | 8/2005 | Blackstone ................ 62/259.3 | | | |
| 2005/0186247 A1* | 8/2005 | Hunter et al. ............... 424/423 | | | |
| 2005/0191248 A1* | 9/2005 | Hunter et al. ................. 424/50 | | | |
| 2006/0240063 A9* | 10/2006 | Hunter et al. ............... 424/423 | | | |
| 2006/0240064 A9* | 10/2006 | Hunter et al. ............... 424/423 | | | |

FOREIGN PATENT DOCUMENTS

| | | |
|---|---|---|
| EP | 0 344 452 | 12/1989 |
| GB | 766 712 | 1/1957 |
| GB | 1 510 049 | 5/1978 |

* cited by examiner

CLOTHES DRYER

BACKGROUND OF THE INVENTION

This invention relates to a dryer with a rotary drum for receiving laundry and a bearing for rotary mounting of the drum.

Dryers are known in which a drum is arranged horizontally for receiving laundry, and is pivoted by pivot bearings. The pivot bearings are subject to high thermal loads which negatively influence the reliability and life of the bearings, particularly when they are arranged adjacent to ducts conveying hot process air.

SUMMARY OF THE INVENTION

The object of the invention is to make available a dryer that operates reliably, with a drum that is swivelled by means of a bearing.

This object is achieved by the characteristics in claim 1. Advantageous embodiments and further developments of the invention are described in the dependent claims.

A dryer has a housing in which a drum for receiving laundry is swivelled by means of a bearing. To ensure that the bearing operates reliably at all times, a cooling device is provided for cooling the bearing. This enables the maximum thermal expansion of the drum bearing components to be reduced and hence also the mechanical load. Furthermore, the lubricant provided for the bearing is subjected to lower loads because of the cooling of the bearing if the bearing is operated at lower temperatures. Moreover, there is reduced risk of the lubricant in the bearing becoming fluid at low temperatures and escaping. This increases the life and reliability of the bearing, and hence of the dryer.

In an advantageous embodiment the cooling device comprises means for improving the radiation and/or convection of heat from the bearing or adjacent to the bearing. In particular, cooling faces may be provided which are connected thermally and conductively to the bearing. Such cooling faces may be formed by a suitably large surface design of the bearing bracket or by providing cooling ribs.

In an advantageous embodiment the cooling device has a device for conveying cooling air, preferably ambient air, to the bearing. This makes available active cooling with which defined thermal conditions can be created on the bearing.

In an advantageous embodiment a fan is provided for conveying process air through the drum and/or for conveying cooling air for a condenser, wherein the fan serves as a device for conveying cooling air to the bearing. This also makes it possible to make use of fans that are already installed in the dryer, either a fan for conveying process air or a fan for conveying cooling air to a condenser, as a cooling device for cooling the bearing.

In an advantageous embodiment a process air conduit is provided, wherein a section of the process air conduit and/or the drum is loaded with a vacuum due to the conveying action of the fan, and forms a vacuum space. Furthermore, a cooling conduit is provided between the vacuum space and the bearing so that air is sucked in adjacent to the bearing in the form of ambient air and conveyed by the cooling conduit as spent air to the process air.

In an advantageous embodiment the bearing has a bearing bracket which is secured to the housing, and a process air duct has an air distribution hood adjacent to the bearing which covers the process air inlet holes into the drum, wherein a cooling air conduit is formed between the air distribution hood and the bearing bracket, in the form of an annular gap, so that a cooling air flow is able to flow through the annular gap into the process air duct in the form of ambient air. The bearing is flushed on all sides with cooling air through the annular gap and is therefore effectively cooled.

In an advantageous embodiment a process air conduit is provided, wherein a section of the process air conduit and/or the drum is loaded with excess pressure by the conveying action of the fan, and forms an excess pressure space. Furthermore, a cooling conduit is provided between the excess pressure space and the bearing, so that some of the conveyed air is fed to the bearing in order to cool the bearing.

In an advantageous embodiment the process air conduit is provided as a circuit with a condenser which is cooled by a cooling air flow. Some of the cooling air flow is branched and fed via a cooling air conduit to the bearing in order to cool the bearing.

In an advantageous embodiment the cooling conduit is dimensioned so that the quantity of cooling air can be predetermined.

BRIEF DESCRIPTION OF THE DRAWINGS

Further details, characteristics and advantages of the invention are evident from the following description of a preferred exemplary embodiment of a dryer according to the invention, with reference to the drawings, in which.

DETAILED DESCRIPTION OF THE PREFERRED EMBODIMENTS

Figure 1:
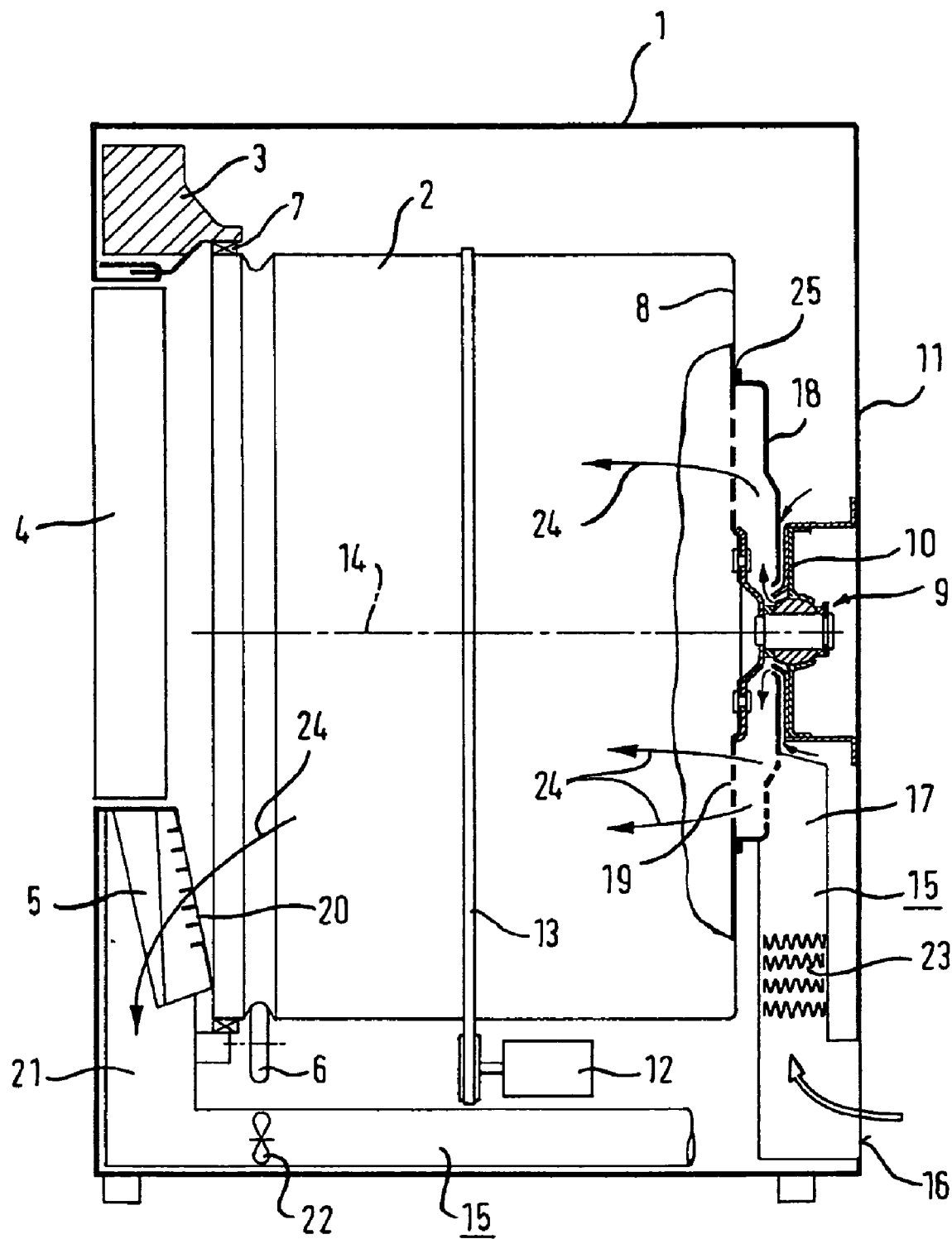
FIG. 1 shows a sectional view of a dryer with a bearing for the drum according to a first exemplary embodiment.
Figure 2:
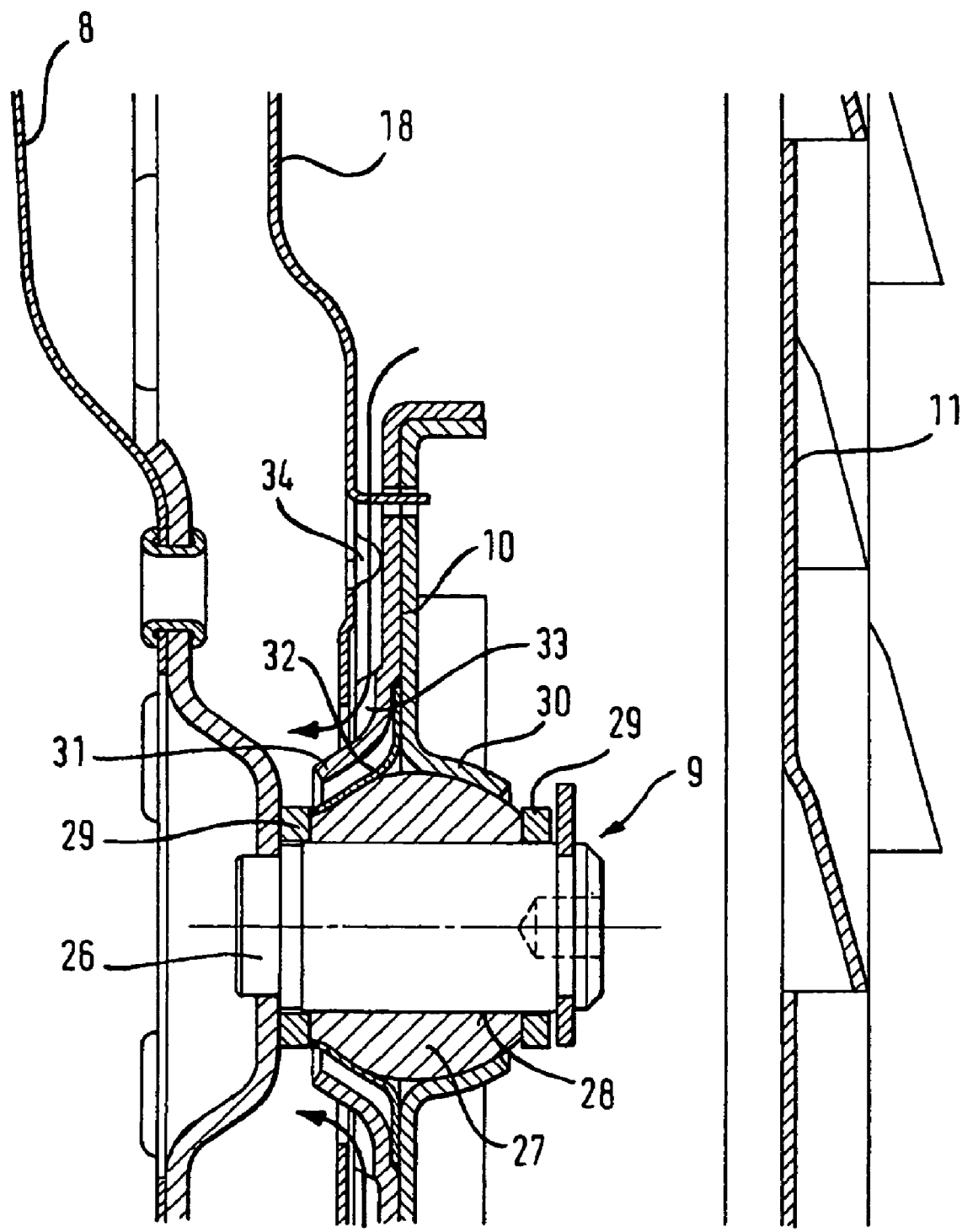
FIG. 2 shows a detailed view of the bearing according to the dryer in FIG. 1.

According to FIGS. 1 and 2 a first exemplary embodiment of a dryer is represented in the form of an exhaust dryer. The dryer has a housing 1, a drum 2 mounted in housing 1, a front end plate 3, a feed door 4 arranged in the front end plate 3 and a lint screen 5 fitted in the lower section of front end plate 3. Drum 2 is mounted in the front section above rollers 6 arranged on the front end plate 3 and in the rear section above a central bearing 9 arranged on rear wall 8 of drum 2, which bearing is in turn secured by a bracket 10 to rear wall 11 of housing 1. Drum 2 is rotated about horizontal axis 14 by a motor 12 and a belt 13. The dryer has a process air conduit 15 which, in this exemplary embodiment, comprises an inlet opening 16, an inlet duct 17, an air distribution hood 18 connected to it, which covers process air inlet holes 19 arranged on rear wall 8 of drum 2, a process air outlet grid 20, lint screen 5 and an outlet duct 21, with a fan 22. A heater 23 is also arranged in inlet duct 17. The process air flows in arrow direction 24 from the ambient atmosphere into inlet opening 16 via inlet duct 17, heater 23, air distribution hood 18, drum 2, process air outlet grid 20, lint screen 5, outlet duct 21 and fan 22 back into the ambient atmosphere. Air distribution hood 18 is sealed against rear wall 8 of drum 2 by means of a rear seal 25. Upstream from fan 22, a vacuum space is formed, in particular in drum 2 and air distribution hood 18.

Bearing 9 is shown in more detail in FIG. 2. Bearing 9 has a shaft 26 which is secured to rear wall 8 of drum 2, and a spherical bearing member 27, which is preferably manufactured from oil saturated sinter material. Bearing member 27 has a hole 28 in which shaft 26 is able to rotate. Furthermore, bearing 9 has two seals 29. Bracket 10 has an outer half-shell 30 and an inner half-shell 31, between which the spherical bearing member 27 is retained. Between outer half-shell 30 and inner half-shell 31 is arranged a conical spring element 32, which restricts the bearing member 27 from also rotating. Spherical bearing member 27 is able to perform swivel movements transversely to the horizontal center line 14, to compensate for an angular displacement of drum 2. The central section of air distribution hood 18 is secured on the inside of bracket 10, parallel with bracket 10, forming an annular gap 33. Annular gap 33 is formed by spacer members 34, which are formed on air distribution hood 18.

Outer half-shell 30 and inner half-shell 31 are each manufactured from a steel sheet which is capable of transferring heat away from the bearing and discharging heat by thermal radiation and convection. However, since there is hot process air between rear wall 8 of the drum and air distribution hood 18, bearing 9 is subjected to considerable heating. Due to the provision of annular gap 33 between bracket 10 and air distribution hood 18, a cooling conduit is formed between the vacuum space in the drum 2 and bearing 9, wherein cool ambient air is sucked into the process air as so-called spent air passing through annular gap 33 on bearing 9. In particular, fan 22, which is responsible for building up the vacuum in drum 2, therefore serves as a conveying device. Because of the formation of the relatively long, parallel annular gap 33, a large surface is made available for heat transfer from the hot bearing to the cooling ambient air flowing through annular gap 33. A very simple device is therefore made available for cooling bearing 9 using the other devices, such as fan 22 of the dryer.

Figure 3:
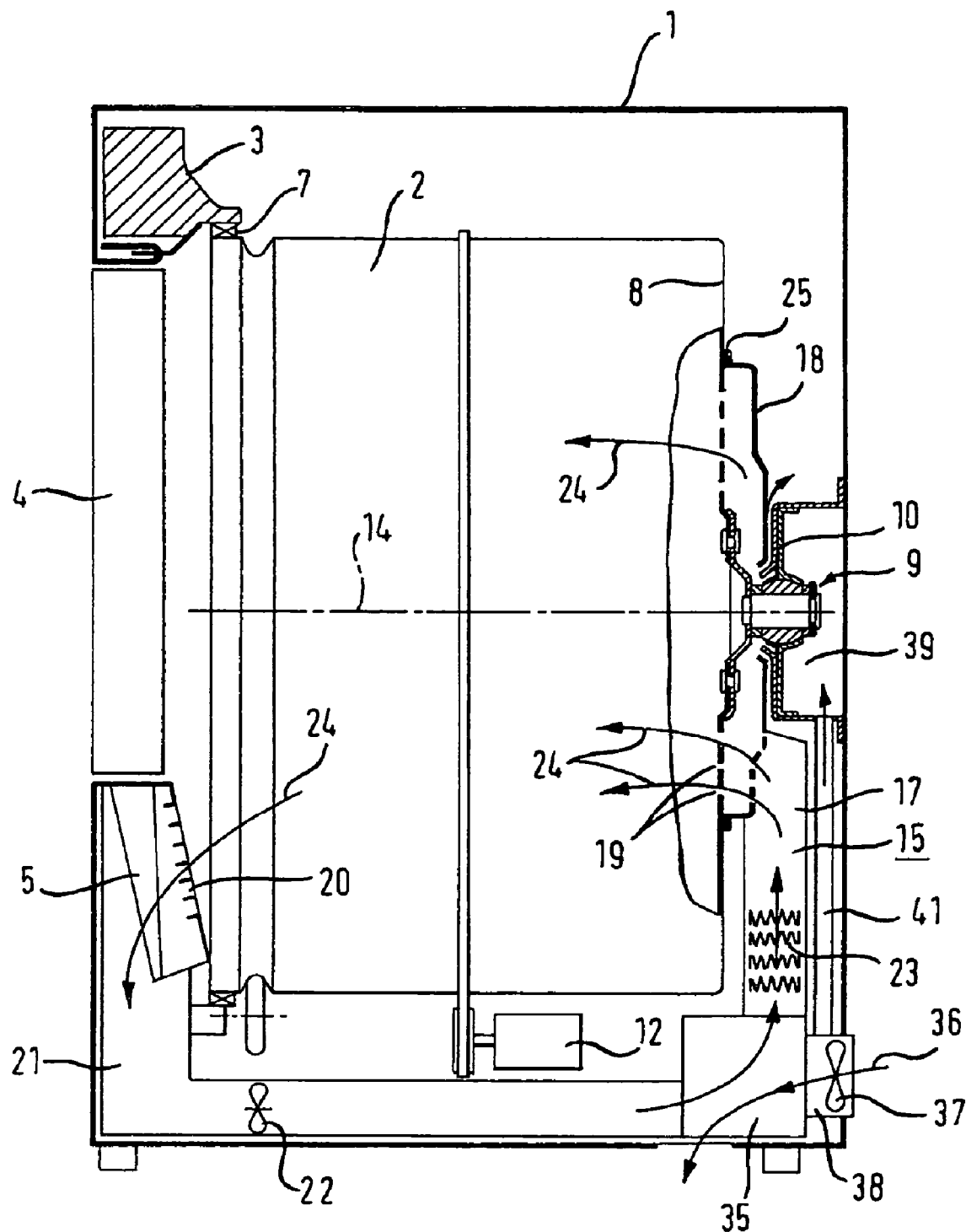
FIG. 3 shows a sectional view of a dryer with a bearing for the drum according to a second exemplary embodiment.
Figure 4:
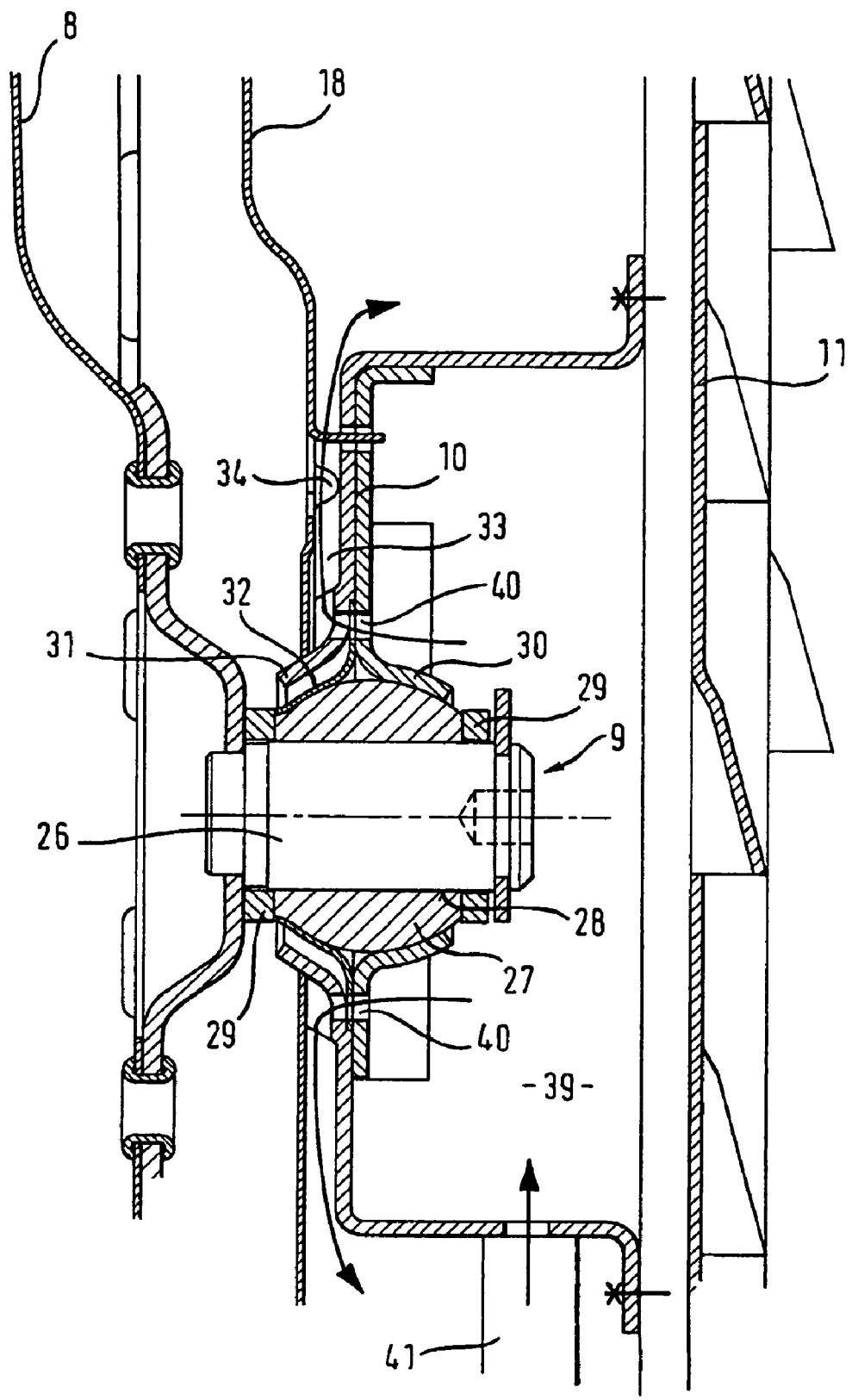
FIG. 4 shows a detailed view of the bearing according to the dryer in FIG. 3.

FIGS. 3 and 4 show a second exemplary embodiment of the dryer in the form of a condensation dryer. Only the differences relative to the dryer designed as an exhaust dryer are shown below in FIGS. 1 and 2. Process air conduit 15 is designed as a closed circuit in which a condenser 35 is also inserted, which condenser is normally designed as a cross flow or counterflow condenser, and is cooled by means of a condenser cooling air flow 36. Condenser cooling air flow 36 is produced in a condenser cooling air conduit 38 by an additional fan 37, which can be mounted on the same drive shaft as fan 22. A cooling air conduit 41, which opens into a space 39 between rear wall 11 of housing 1 and bracket 10, is branched off from the section of condenser cooling air conduit 38 on the pressure side. As shown in more detail in FIG. 4, the cooling air flows into space 39, and through openings 40 formed in the bracket into annular gap 33 between bracket 10 and air distribution hood 18.

Figure 5:
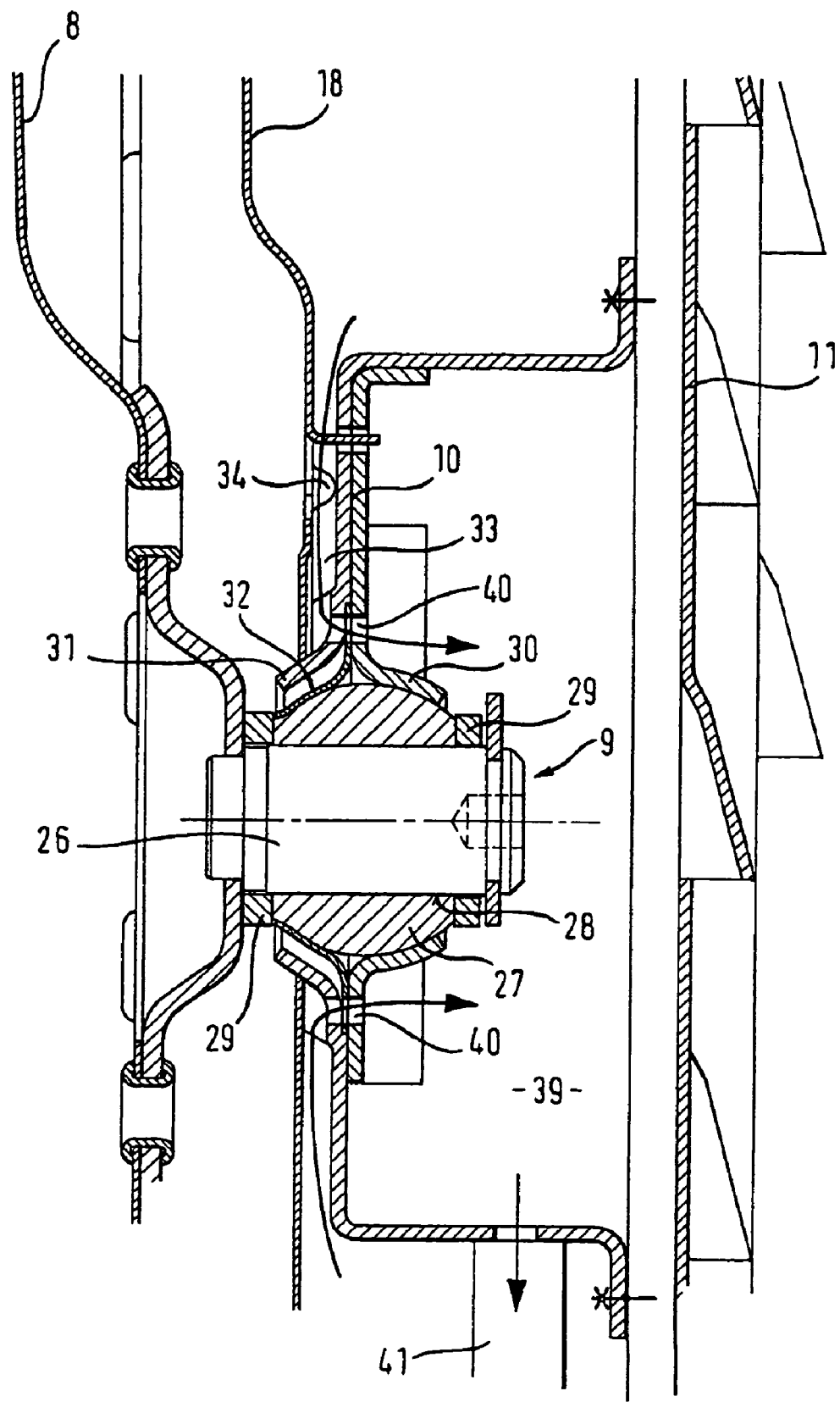
FIG. 5 shows a sectional view of a dryer with a bearing for the drum as a modified first or second exemplary embodiment.

FIG. 5 shows a modification both for the exemplary embodiment according to FIGS. 1 and 2 and for the exemplary embodiment in FIGS. 3 and 4. In this modification the direction of the cooling air flow according to FIG. 4 is reversed, and cooling air is sucked off through cooling air conduit 41 from space 39 through annular gap 33. Here the suction may take place on cooling air conduit 41 either via the suction side of condenser cooling air conduit 38 (FIG. 3) or via the suction side of process air conduit 15, upstream from heater 23 shown in FIG. 1.

Alternatively to the embodiment shown in FIG. 1, fan 22 may be arranged upstream from drum 2, so that an excess pressure prevails in the process air conduit before drum 2, and also in drum 2. Some of this air upstream from drum 2, and also upstream from heater 23, may be fed through a branch conduit to bearing 9 in order to cool bearing 9.

The invention claimed is:

1. A dryer with a housing, a rotary drum for receiving laundry and a bearing for the rotary mounting of the drum in the housing, and with a bracket secured to the housing, and with a cooling device for cooling the bearing, comprising a cooling air conduit, a process air conduit, comprising an air distribution hood adjacent to the bearing, which hood covers process air inlet holes in the drum, the cooling air conduit is formed between the bracket and the air distribution hood in the form of an annular gap, wherein the gap is formed from the bracket and the air distribution hood.

2. The dryer according to claim 1, wherein the annular gap is arranged around the bearing.

3. The dryer according to claim 1, wherein the cooling device comprises means for improving the radiation or convection of heat from the bearing and/or from the area adjacent to the bearing, and/or wherein cooling faces are provided which are thermally and conductively connected to the bearing.

4. The dryer according to claim 1, wherein the cooling device has a device for feeding cooling air, preferably ambient air, to the bearing.

5. The dryer according to claim 4, wherein a fan is provided for conveying process air through the drum and/or for conveying cooling air for a condenser, wherein the fan belongs to the device for feeding cooling air to the bearing.

6. The dryer according to claim 5, wherein a process air conduit is provided, wherein a section of at least one of the process air conduit and the drum is loaded with a vacuum by a conveying action of the fan, and forms a vacuum space, and wherein a cooling air conduit is provided between the vacuum space and the bearing, through which conduit air can be sucked in the form of ambient air adjacent to the bearing, and can be as spent air to the process air.

7. The dryer according to claim 5, wherein a process air conduit is provided, wherein a section of at least one of the process air conduit and the drum is loaded with a vacuum by a conveying action of the fan, and forms a vacuum space, and wherein a cooling air conduit is provided between the vacuum space and the bearing, through which conduit some of the air conveyed to the fan can be fed to the bearing in order to cool the bearing.

8. The dryer according to claim 1, wherein a process air conduit is provided as a circuit with a condenser which is cooled by a cooling air flow, and in which some of the cooling air flow is branched and fed via a cooling air conduit to the bearing in order to cool the bearing.

9. The dryer according to claim 1, wherein the quantity of cooling air for the bearing is determined by the dimension of the cooling air conduit.

10. A laundry dryer comprising:
a housing,
a drum disposed within the housing;
a bearing supporting the drum for rotational movement with respect to the housing;
a process air conduit disposed in the housing and including a fan generating a process air flow within the housing;
an air distribution hood directing the process air flow from the process air conduit into the drum;
a bracket connected to the housing and supporting the bearing; and
an annular gap disposed between the bracket and the air distribution hood, the annular gap receiving a cooling air flow of ambient air from outside the process air conduit to cool the bearing.

11. The laundry dryer according to claim 10, wherein the bracket extends radially outwardly from the bearing.

12. The laundry dryer according to claim 10, wherein the bracket is made from a thermally conductive material discharging heat from the bearing.

13. The laundry dryer according to claim 12, wherein the bracket is made from a metal material.

14. The laundry dryer according to claim 10, wherein the process air conduit includes a heater heating the process air flow upstream of the air distribution hood.

15. The laundry dryer according to claim 10, wherein the laundry dryer comprises an exhaust dryer including an inlet opening receiving an air flow into the process air conduit and an exhaust for discharging the process air flow out of the housing.

16. The laundry dryer according to claim 10, wherein the annular gap discharges the cooling air flow into the air distribution hood and the cooling air flow mixes with the process air flow.

17. The laundry dryer according to claim 10, wherein the cooling air flow enters the annular gap from a radially outer end and flows radially inwardly toward the bearing.

18. The laundry dryer according to claim 10, wherein the laundry dryer comprises a condenser dryer and the process air conduit forms a closed circuit including a condenser removing moisture from the process air flow, a cooling air conduit directing the cooling air flow of ambient air toward the annular gap.

19. The laundry dryer according to claim 18, wherein the bracket includes multiple openings extending through the bracket adjacent the bearing and being in fluid flow communication with the annular gap, the cooling air flow entering the annular gap through the multiple openings and flowing radially outwardly through the annular gap away from the bearing, the cooling air flow and the process air flow remaining separate from one another.

20. The laundry dryer according to claim 18, wherein the bracket includes multiple openings extending through the bracket adjacent the bearing and being in fluid flow communication with the annular gap, the cooling air flow entering the annular gap from a radially outer end and flowing radially inwardly toward the bearing and being discharged from the annular gap through the multiple openings, the cooling air flow and the process air flow remaining separate from one another.

* * * * *

UNITED STATES PATENT AND TRADEMARK OFFICE
CERTIFICATE OF CORRECTION

PATENT NO. : 7,644,514 B2 Page 1 of 1
APPLICATION NO. : 10/584162
DATED : January 12, 2010
INVENTOR(S) : Heyder et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 348 days.

Signed and Sealed this

Sixteenth Day of November, 2010

David J. Kappos
*Director of the United States Patent and Trademark Office*